United States Patent [19]
Chilton et al.

[11] Patent Number: 6,024,604
[45] Date of Patent: Feb. 15, 2000

[54] BYPASS TAP TOOL

[75] Inventors: Robert Joseph Chilton, Fort Washington, Pa.; Livia N. McCleary, Cherry Hill, N.J.; William Henry Segarra, Linwood, Pa.

[73] Assignee: General Instrument Corporation, Horsham, Pa.

[21] Appl. No.: 09/138,490

[22] Filed: Aug. 24, 1998

[51] Int. Cl.[7] .............................. H01R 9/05; H01R 17/04
[52] U.S. Cl. ..................... 439/579; 174/52.1; 333/100; 333/132; 439/188
[58] Field of Search ................................... 174/155, 156, 174/157, 35 R; 439/579, 944, 188; 200/506, 51.1, 51.09, 305; 333/100, 132

[56] References Cited

U.S. PATENT DOCUMENTS

| | | | |
|---|---|---|---|
| 3,132,289 | 5/1964 | Russo | 317/108 |
| 3,134,931 | 5/1964 | Kobryner | 317/104 |
| 3,171,909 | 3/1965 | Foskett | 200/51.1 |
| 3,617,811 | 11/1971 | McVoy | 317/99 |
| 3,643,209 | 2/1972 | Coston | 339/155 R |
| 3,764,956 | 10/1973 | Norden | 339/74 R |
| 3,768,063 | 10/1973 | Coffman | 339/31 R |
| 3,881,160 | 4/1975 | Ross | 333/8 |
| 3,895,318 | 7/1975 | Ross | 333/6 |
| 3,914,564 | 10/1975 | Reed et al. | 200/51 |
| 3,962,160 | 6/1976 | Reed et al. | 317/108 |
| 4,226,495 | 10/1980 | Palle et al. | 439/535 |
| 4,388,670 | 6/1983 | Billhartz | 361/367 |
| 4,660,921 | 4/1987 | Hauver | 339/177 R |
| 4,755,776 | 7/1988 | Preschutti | 333/100 |
| 4,825,021 | 4/1989 | Pauza | 200/504 |
| 4,963,966 | 10/1990 | Harney et al. | 348/5.5 |
| 5,281,933 | 1/1994 | Chamberlin | 333/132 |
| 5,599,198 | 2/1997 | Wang | 439/188 |
| 5,648,745 | 7/1997 | Spriester et al. | 333/100 |
| 5,655,294 | 8/1997 | Makino | 29/845 |
| 5,756,935 | 5/1998 | Balanovsky et al. | 174/52.1 |
| 5,814,905 | 9/1998 | Tang | 307/147 |
| 5,909,154 | 6/1999 | Brown et al. | 333/100 |

*Primary Examiner*—Khiem Nguyen
*Assistant Examiner*—Michael C. Zarroli
*Attorney, Agent, or Firm*—Volpe and Koenig, P.C.

[57] ABSTRACT

A tool and method for bypassing a signal. The bypass tap tool generally comprises a housing, a pair of conductively interconnected contact assemblies and an insulation assembly. The contact assemblies are positioned in and extending from the housing. The insulator assembly is mounted on the housing and includes two insulator extensions. Each extension is adjacent to a respective contact assembly and is moveable between a non-insulating position and an extended insulating position.

To prepare the signal tap for service, the bypass tap tool is interconnected with the signal tap with the contact assemblies entering the plug ports and conductively contacting the contact terminals to provide a bypass route and the extensions are moved from the non-insulating position to the extended insulating position wherein they are adjacent to and insulate the contact terminals.

22 Claims, 15 Drawing Sheets

BYPASS TAP TOOL

BACKGROUND OF THE INVENTION

1. Field of the Invention

The present invention relates to cable television transmission components. More particularly, the invention relates to an apparatus used in conjunction with a cable television tap. The apparatus allows servicing of the cable television tap without interruption of the cable signal to downstream subscribers and minimizes the chance of a short circuit in the system.

2. Description of Related Art

Cable television (CATV) services are provided to subscribers through transmission networks that include taps, splitters, amplifiers and other equipment that distribute CATV service and ensure that the CATV signal quality is maintained. In particular, taps reside along the network to provide access outlets for localized subscribers. CATV network and service as used herein refers to all systems involving the transmission of television signals from the headend over a transmission medium, such as fiber optic cable or coaxial cable.

Figure 1:
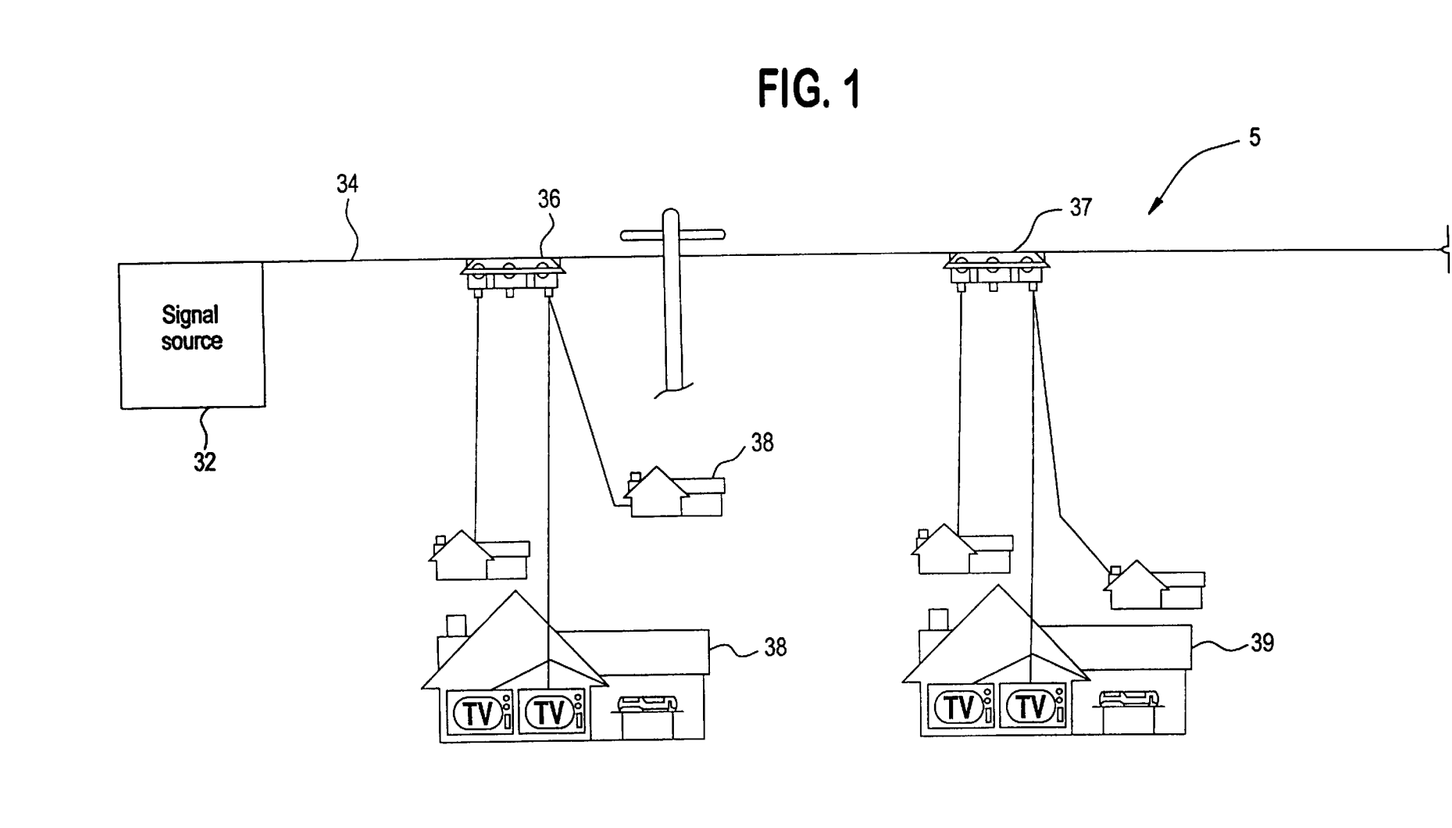
FIG. 1 is an overall system block diagram of a typical cable television system.

FIG. 1 is a block diagram of a CATV network 5. The transmission line 34 provides cable signals from the headend 32 to subscribers 38, 39 at remote locations. The subscribers 38, 39 receive signals through taps 36, 37 placed along the transmission line 34. The CATV signals are typically routed into the tap and through a printed circuit board attached to the tap cover which splits the signal and allows each tap 36, 37 to typically provide a connection to four or more subscribers.

Figure 2:
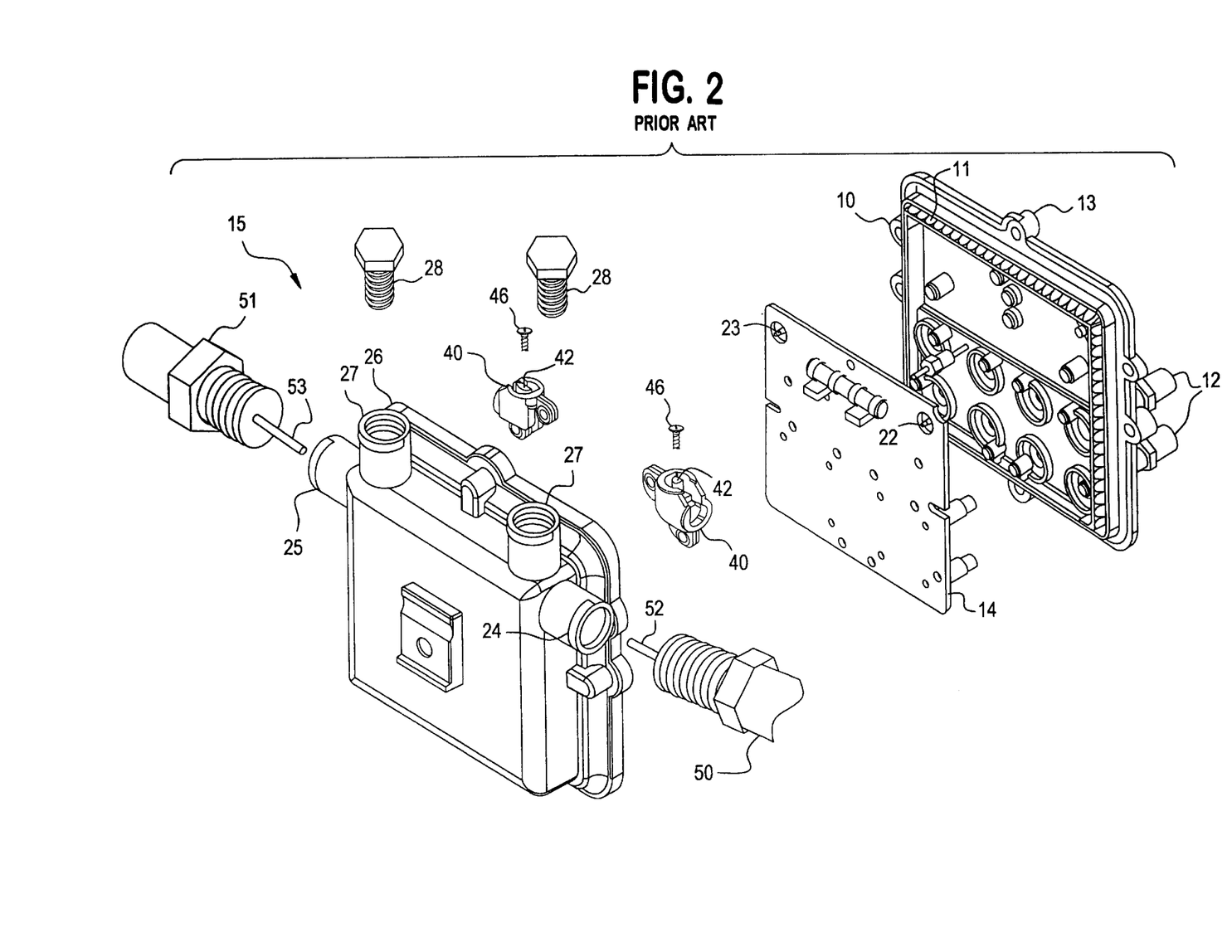
FIG. 2 is a perspective view of a prior art cable tap.

Referring to FIG. 2, a prior art CATV multiple tap 15 is shown. The multiple tap 15 generally includes a tap cover 10, a printed circuit board 14, a pair of terminal housings 40 and a main housing 26. The tap cover 10 is provided with a plurality of tap outlets 12, each of which provides CATV service to a different subscriber. The printed circuit board 14 is rigidly attached to the inside surface of the cover 10 and includes a pair of signal receptors 22, 23. The signal receptors 22, 23 allow the signal to flow through the printed circuit board 14 and to be split among the subscribers fed from the tap outlets 12. The signal also passes through the tap 15 to a downstream tap 37. A detailed explanation of the function of the printed circuit board 14, which is well known to those skilled in the art, is outside the scope of the present invention. A metal braid 11 surrounds the periphery of the printed circuit board 14 at the junction between the cover 10 and the main housing 26. The metal braid 11 provides an EMI/RFI trap for the printed circuit board 14.

Figure 4:
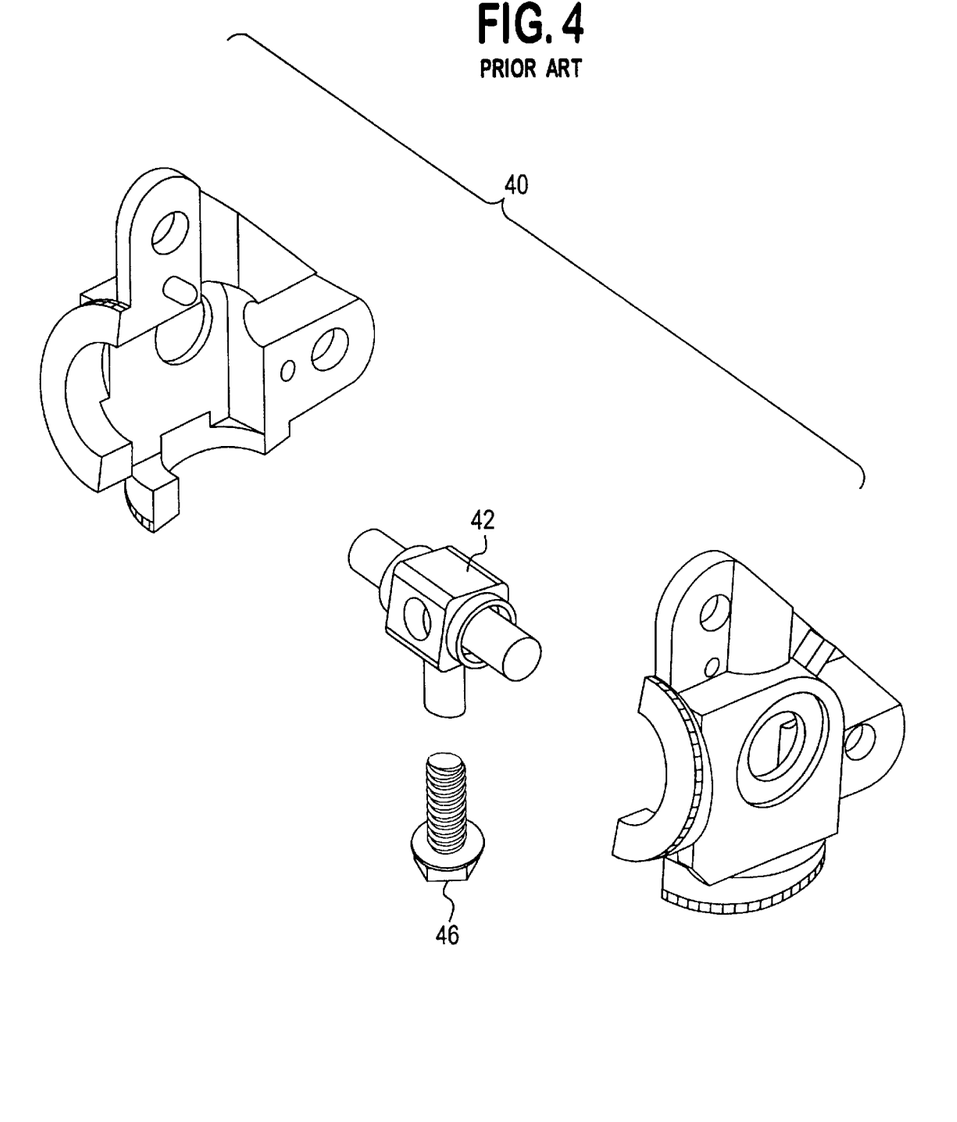
FIG. 4 is a perspective view of a disassembled terminal housing.
Figure 5:
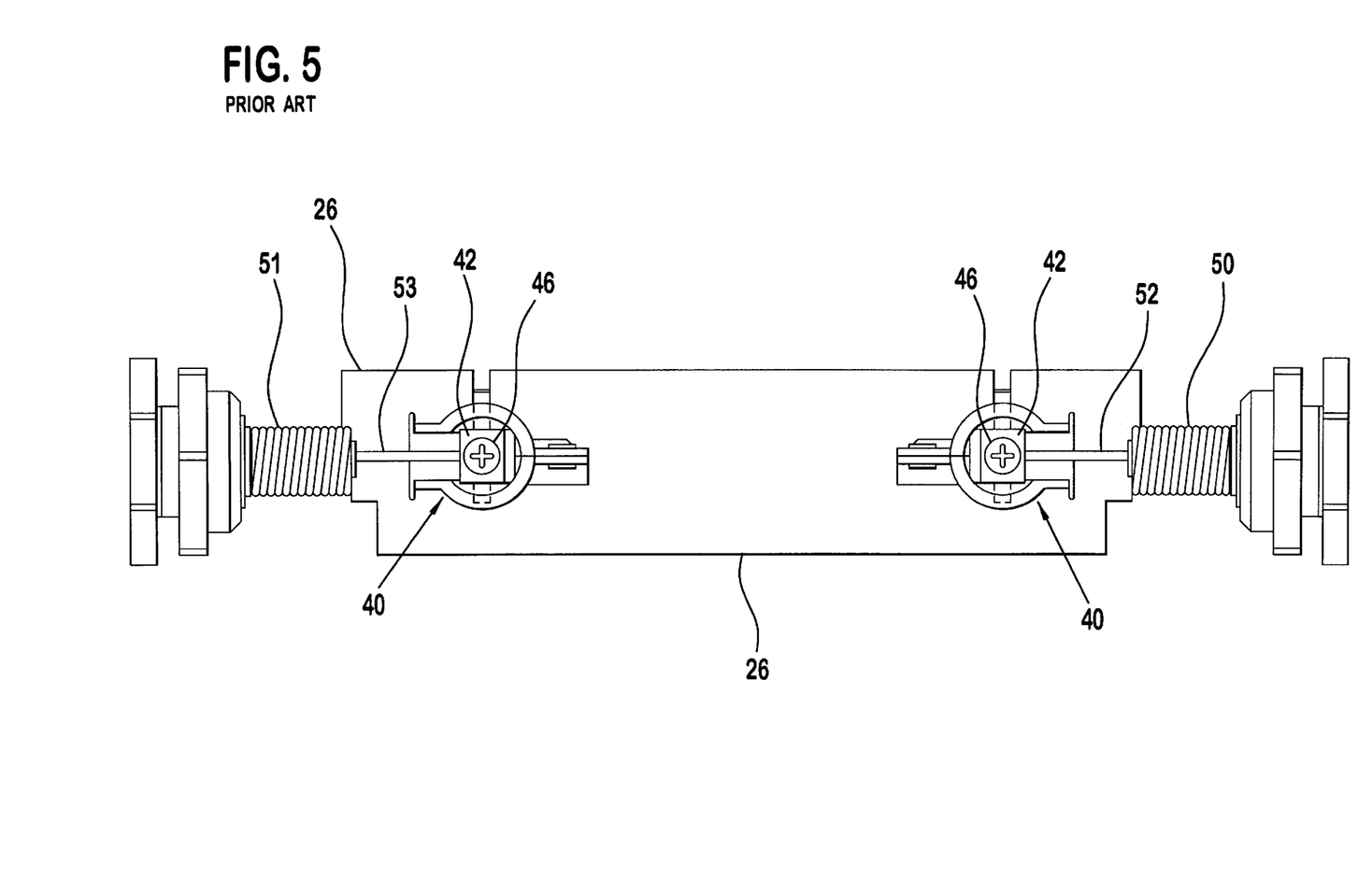
FIG. 5 is a plan view of the cables being connected in the tap.

The main housing 26 includes threaded signal ports 24, 25 at opposing ends. The input signal port 24 is adapted to receive a signal input via a coaxial cable and a signal impact connector 50. The output signal port 25 receives a signal output connector 51 for outputting the received signal to the downstream CATV network. The internal conductor 52, 53 of each coaxial cable 50, 51 is connected inside the tap 15 at a terminal housing 40. A threaded plug port 27 is provided adjacent to each signal port 24, 25 to allow plugs 28 to be removed. Exposed terminal screws 46 aligned with the ports 27 are tightened onto the conductors 52, 53 to fix each to a contact terminal 42 positioned in the respective terminal housing 40 (see FIG. 5). The components of the terminal housing 40 are shown in greater detail in FIG. 4. Upon engagement of the cover 10, the receptors 22, 23 on the printed circuit board 14 engage the contact terminals 42 to complete the circuit.

Figure 3:
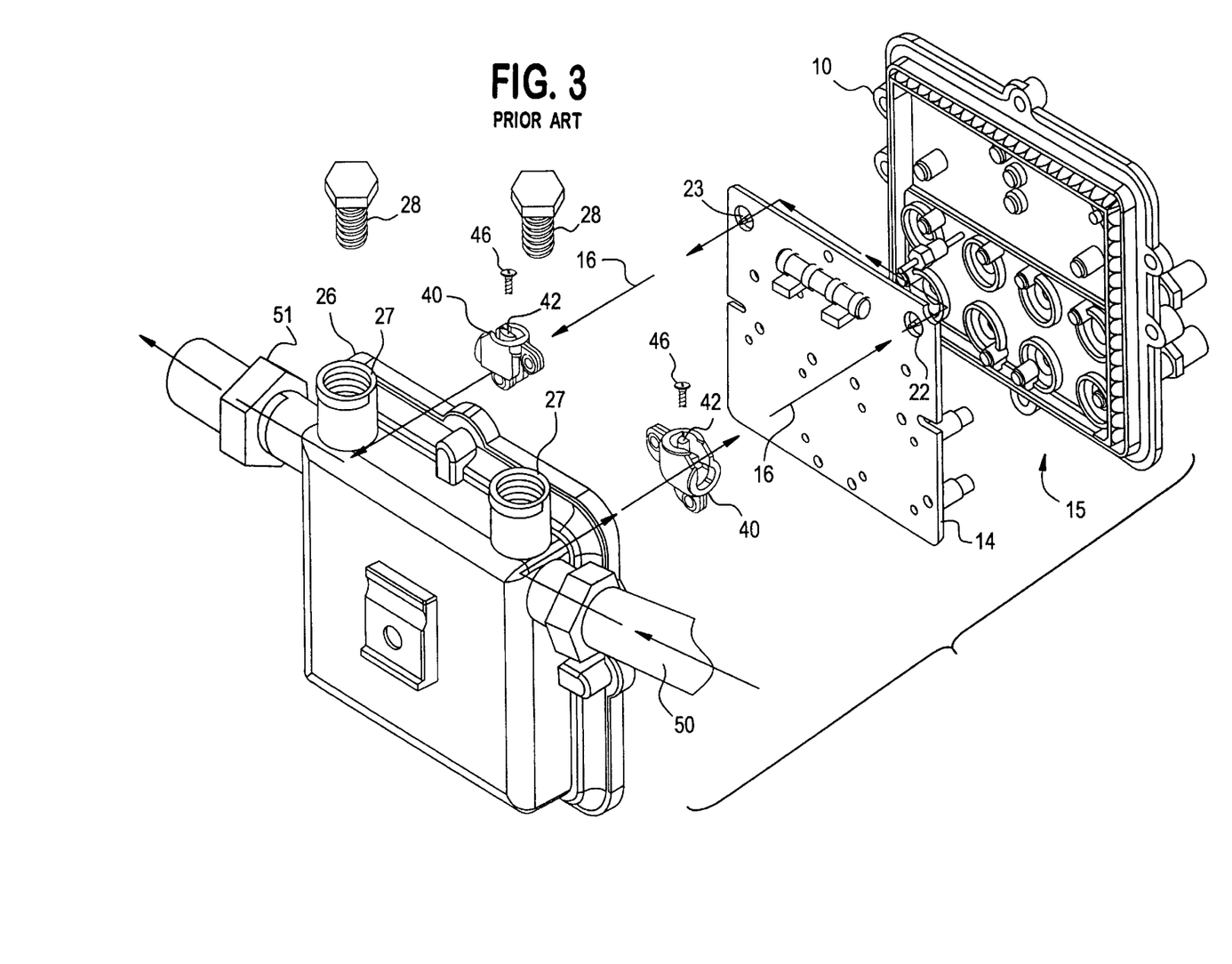
FIG. 3 is a perspective view of the signal path through the prior art cable tap.

Referring to FIG. 3, the uninterrupted signal path 16 for the CATV tap 15 is illustrated. When the cover 10 is installed, the signal, shown as line 16, originates from the signal input connector 50. The signal input conductor 52 contacts the contact terminal 42 within the first terminal housing 40 and the signal flows through the contact terminal 42 to the first signal receptor 22 on the printed circuit board 14. The signal then flows through the printed circuit board 14 (and thus to each individual tap 12) and to the second signal receptor 23. The second signal receptor 23 is coupled to the second contact terminal 42 within the other terminal housing 40 which contacts the conductor 53 within signal output connector 51.

Periodically, the taps 36, 37 require servicing due to malfunctioning of the tap 36, 37 or to connect or disconnect subscribers 38, 39. However, when the cover 10 is removed for servicing the tap 15, the printed circuit board 14 is also removed and the signal path is open-circuited since the signal receptors 22, 23 no longer are connected to the contact terminals 42. As a result, removal of the cover results in interruption of the cable signal over the transmission line 34 to subscribers downstream from that tap. For example, returning to FIG. 1, servicing of the tap 36 not only results in interruption of service to the subscribers 38 who are fed from that tap 36, but also subscribers 39 who access the CATV network 5 through the downstream tap 37. Because of the increasing reliance upon the CATV system for life-saving and other data critical applications, even a momentary signal interruption is undesirable. However, there is often no provision for maintaining uninterrupted service to downstream subscribers when the cover of the tap is removed for servicing.

Figure 6:
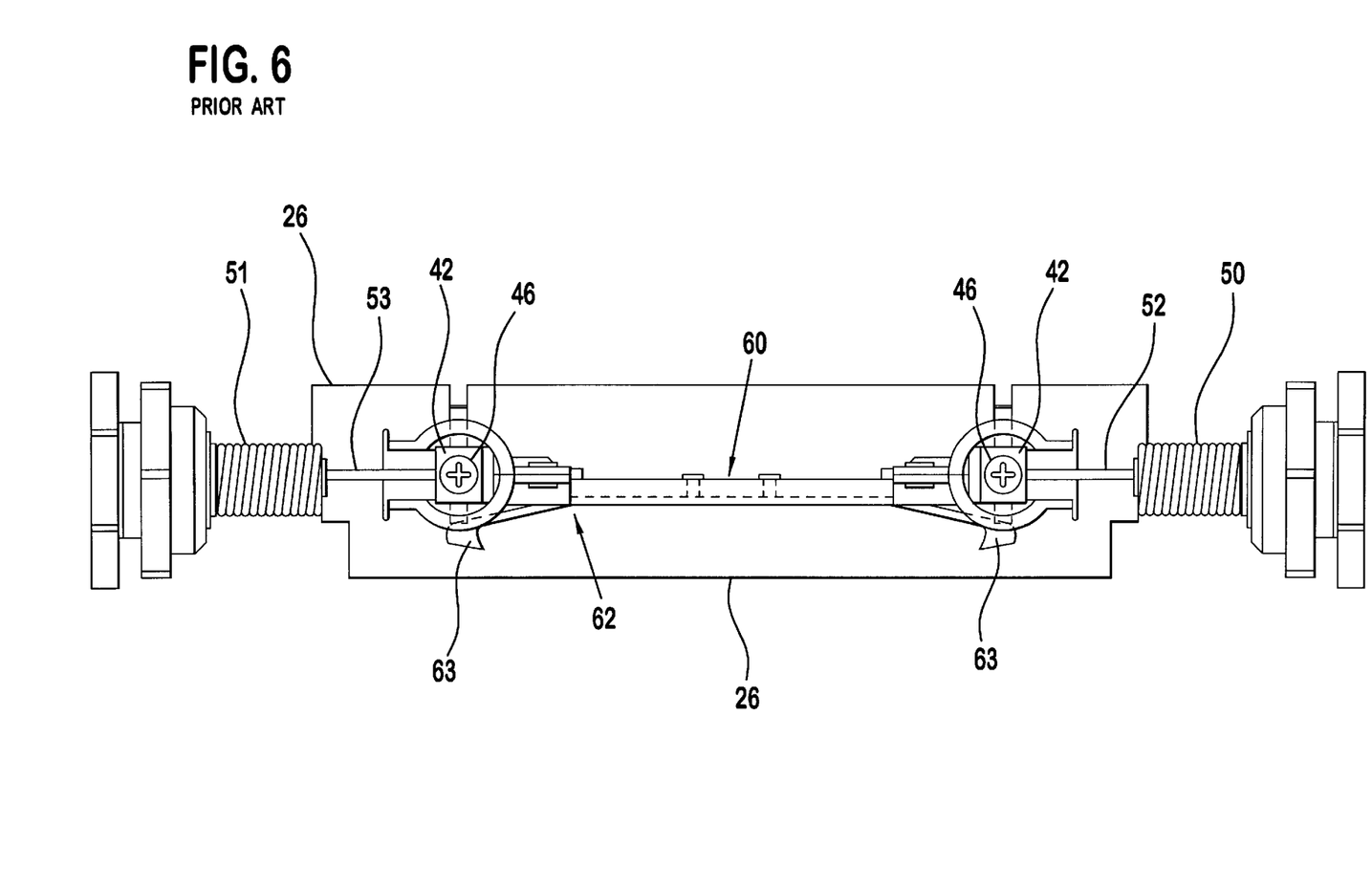
FIG. 6 is a plan view of a tap having a bypass switch with the cover removed.
Figure 7:
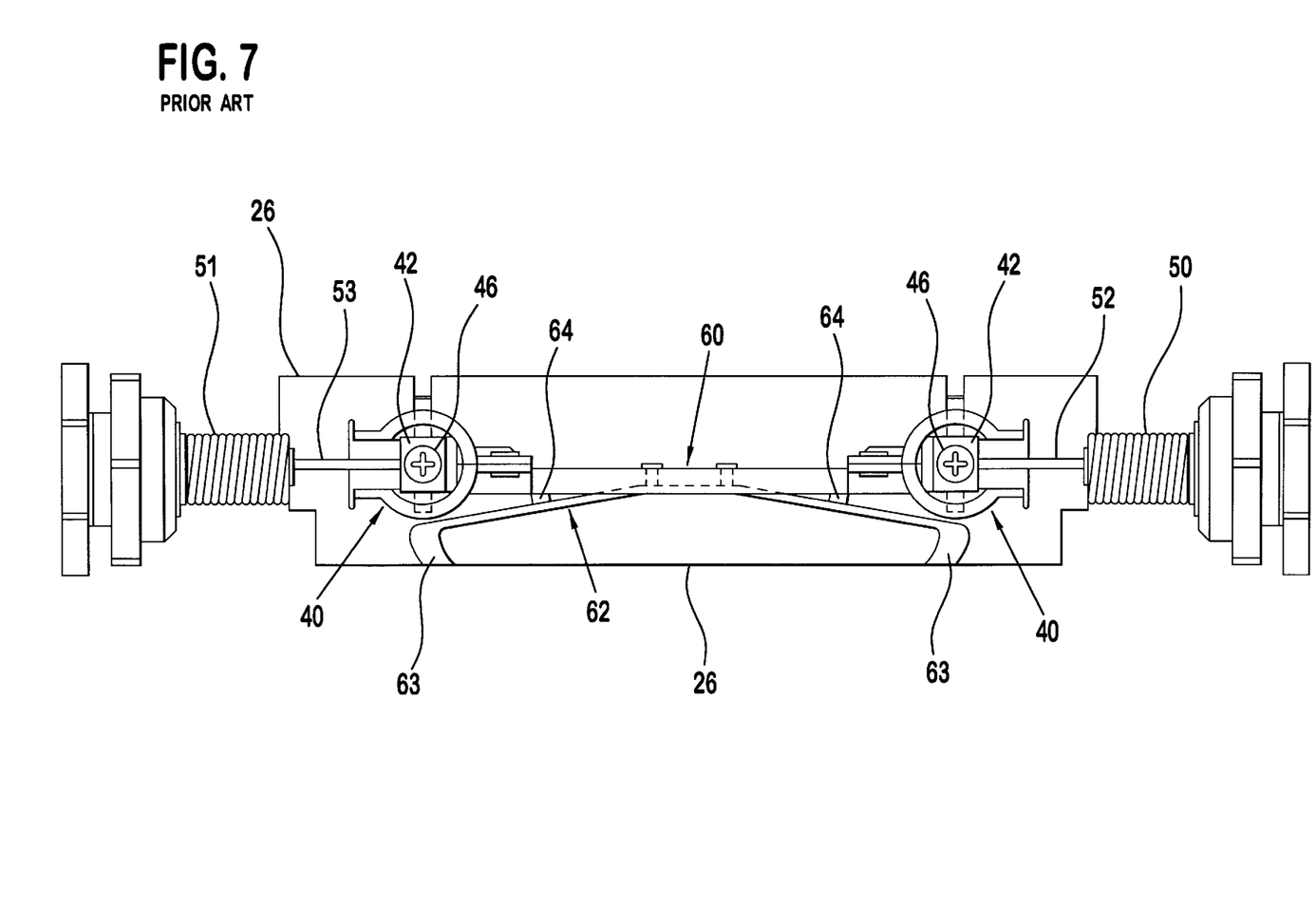
FIG. 7 is a plan view of a tap having a bypass switch with the cover in place.

One system for providing uninterrupted downstream service during servicing of a tap device is described in detail in U.S. Pat. No. 5,756,935 which issued May 26, 1998 and is commonly assigned with the present invention. This system provides an internal bypass switch 60, see FIG. 6, which maintains signal flow when the cover 10 is removed. The bypass switch 60 includes a flexible leaf spring bypass conductor 62. As shown in FIG. 6, removal of the tap cover 10 causes the conductor 62 to automatically contact both contact terminals 42 to thereby maintain uninterrupted service to downstream subscribers. When the tap cover 10 is replaced, see FIG. 7, an actuator 64 disengages and grounds the leaf spring bypass conductor 62 and the signal again flows through the printed circuit board 14.

One problem which occasionally occurs with this type of bypass switch 60 is a short circuit. With the tap cover 10 in place, both ends 63 of the bypass conductor 62 are grounded against the tap housing 26. As the tap cover 10 is removed, one of the ends 63 of the bypass conductor 62 may move into contact with its respective contact terminal 42 while the other end 63 is still grounded against the tap housing 26. This will generally result in a short circuit. Since it may be difficult for a service technician to tell if a tap 15 which is about to be serviced includes a bypass switch 60, it is prudent to treat each tap 15 as if it has a bypass switch 60 with the potential for a short circuit.

Accordingly, it is an object of the invention to provide a bypass system which minimizes the chance of a short circuit while maintaining uninterrupted service to downstream subscribers during removal of the tap cover for servicing.

SUMMARY OF THE INVENTION

The present invention generally relates to tool and method for bypassing a signal. The bypass tap tool generally comprises a housing, a pair of conductively interconnected contact assemblies and an insulation assembly. The housing includes two contact ports in which the contact assemblies are positioned and extending from. The insulator assembly is mounted on the housing and includes two insulator extensions. Each extension is adjacent to a respective contact assembly and is moveable between a non-insulating position and an extended insulating position.

The signal tap is prepared for service by interconnecting the bypass tap tool with the signal tap with the contact assemblies entering the plug ports and conductively contacting the contact terminals to provide a bypass route and moving the extensions from the non-insulating position to the extended insulating position wherein they are adjacent to the contact terminals.

DETAILED DESCRIPTION OF THE PREFERRED EMBODIMENT

The preferred embodiment will be described with reference to drawing figures where the numerals represent like elements throughout.

Figure 8:
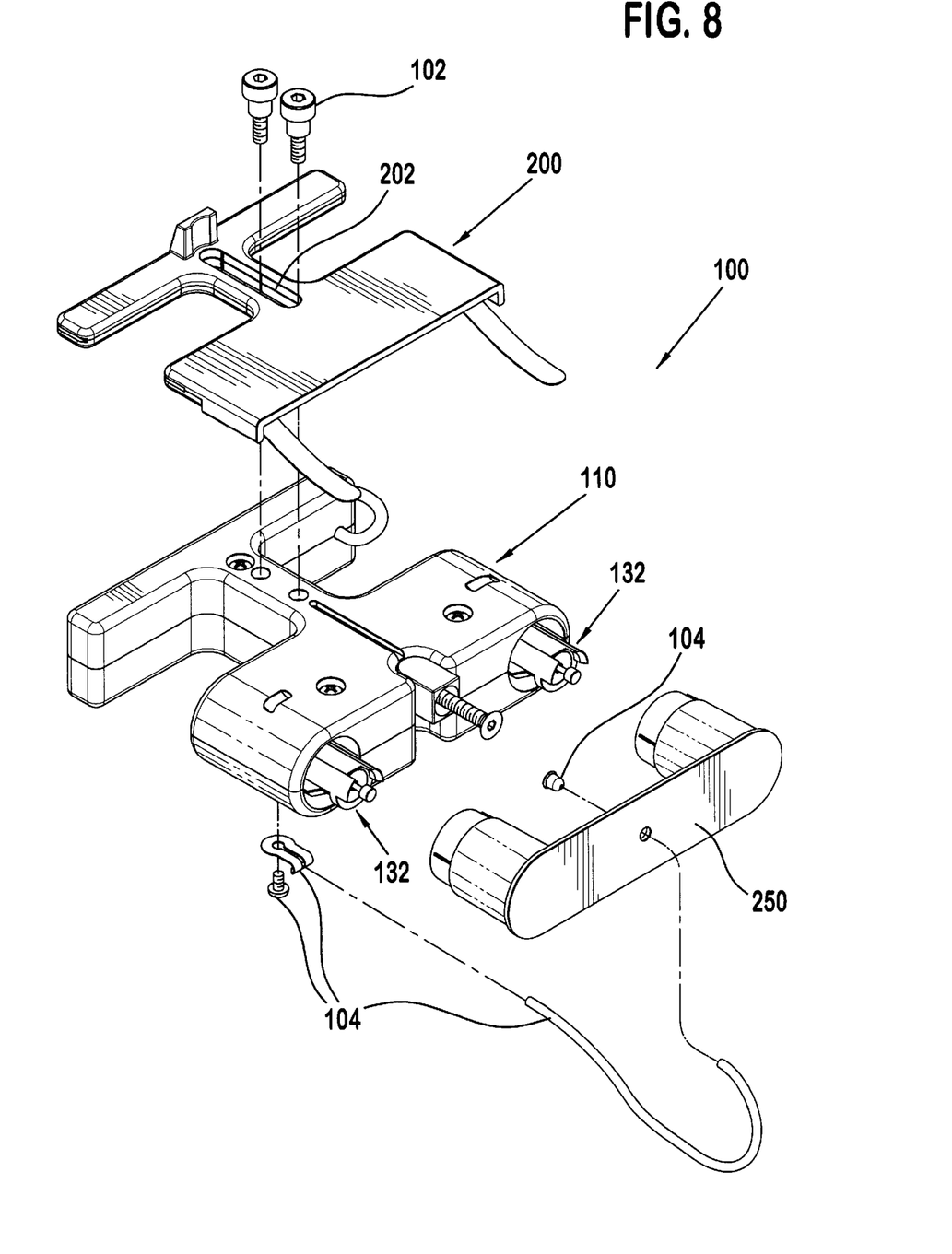
FIG. 8 is an isometric view of the preferred embodiment of the present invention in a partially disassembled condition.
Figure 9:
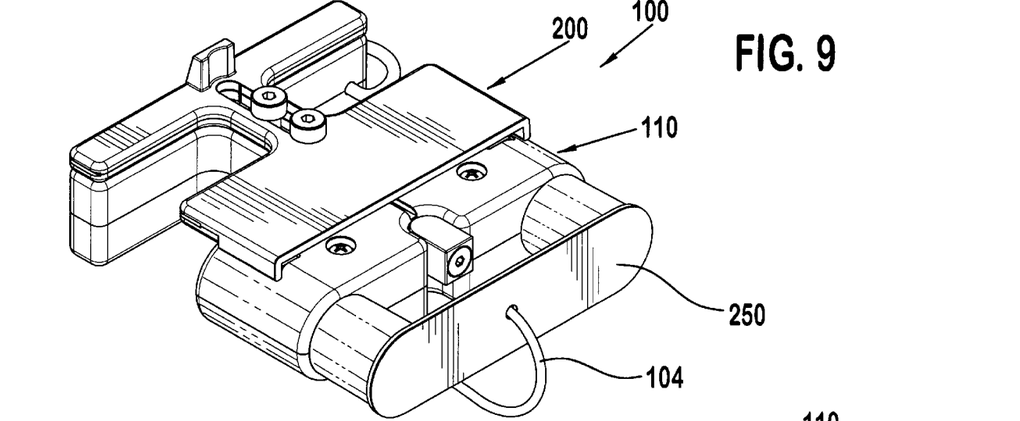
FIG. 9 is an isometric view of the preferred embodiment of the present invention.

The preferred bypass tap tool 100 is shown in FIGS. 8 and 9 and generally comprises a bypass assembly 110, an insulator slide assembly 200 and a protective cap 250. The insulator slide assembly 200 is mounted on the bypass assembly 110 by shoulder bolts 102 extending through an aperture 202 in the slide assembly 200. The bypass assembly 110 provides a bypass route for the signal and the insulator slide assembly 200 extends into the tap 15 to prevent a short circuit. Both components and their functions will be described in more detail hereinafter.

The protective cap 250 is configured to fit over and cover the contact assemblies 132 extending from the bypass assembly 110 when the bypass tap tool 100 is not being used. A chain assembly 104 or the like may be provided to allow suspension of the protective cap 250 from the bypass assembly 110 when it is removed to expose the contact assemblies 132.

Figures 10, 11:
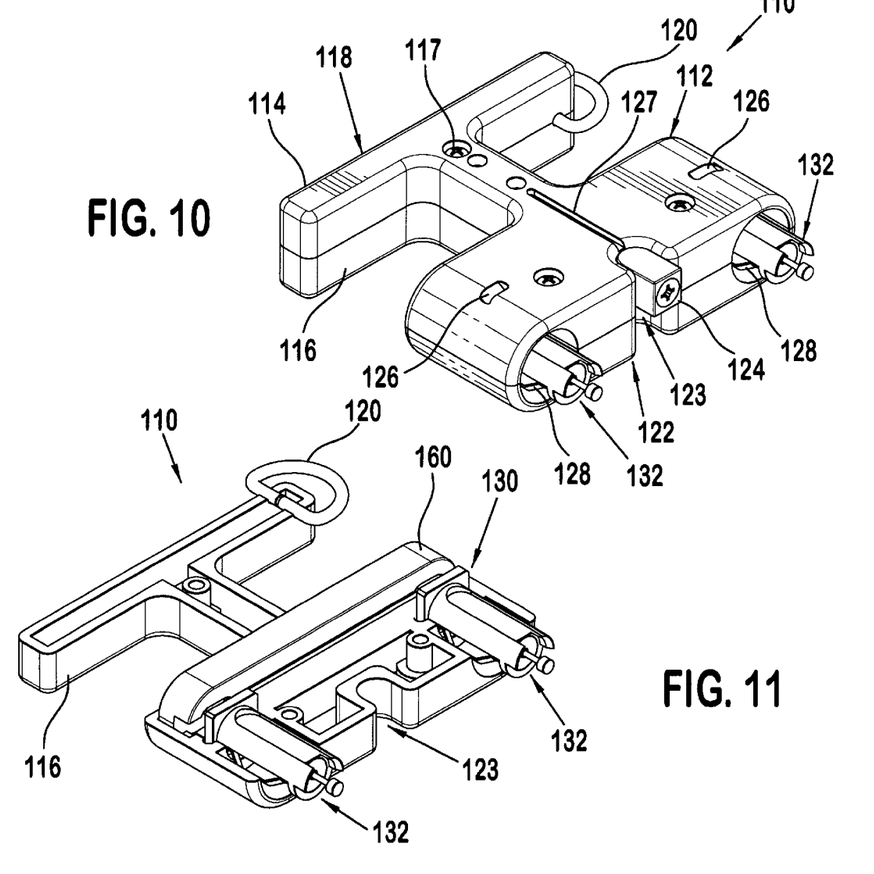
FIG. 10 is an isometric view of the preferred bypass assembly.
FIG. 11 is an isometric view of the preferred bypass assembly with one of the housing members removed.

The bypass assembly 110 will be described in more detail with reference to FIGS. 10–13. As shown in FIG. 10, bypass assembly 110 has a generally I-shaped body 112 having a handle end 118 and a contact end 122. The body 112 comprises complementary upper and lower housing members 114 and 116. The housing members 114 and 116 are preferably connected by a plurality of steel pan head screws 117, however, various connection means may be used. The handle end 118 of the bypass assembly 110 preferably includes a D-ring 120 which allows the tool 100 to be clipped onto a tool belt or the like.

The contact end 122 includes a pair of contact ports 128. The contact ports 128 are spaced such that they align with the plug ports 27 of the tap 15. Extending from each contact port 128 is a contact assembly 132 which is configured to fit within a respective plug port 27 of the tap 15. The configuration of the contact assemblies will be described in greater detail hereinafter. The contact end 122 of the bypass assembly 110 preferably includes a recess 123 in which a key 124 is positioned. The key 124 assists a service technician with alignment of the bypass tool 100 to prevent upside down or otherwise incorrect insertion thereof.

The upper housing member 114 includes a pair of apertures 126, each aligned with a respective contact port 128. The apertures 126 allow passage of insulator extensions 209 into the bypass assembly 110, as will be described in greater detail hereinafter. The upper housing member 114 also includes a groove 127 which assists in alignment of the insulator slide assembly 200 with the bypass assembly 110.

Figure 12:
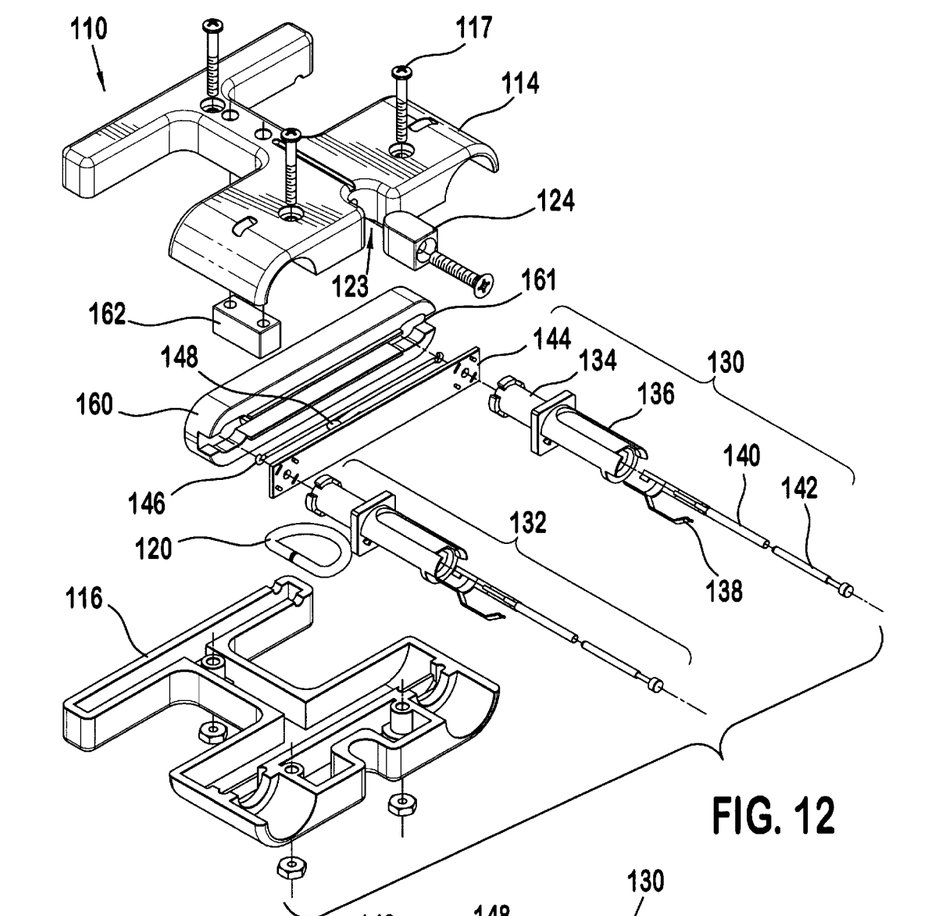
FIG. 12 is an isometric view of the preferred bypass assembly in a disassembled condition.

As shown in FIGS. 11 and 12, both the upper and lower housing members 114 and 116 have internal voids for receiving the various internal components including a filler block 162, reinforcement 160 and the bypass unit 130. The filler block 162 acts as a retaining mechanism for the steel pan head screws 117 which interconnect the upper and lower housing members 114 and 116. The reinforcement 160 helps to prevent deformation of the bypass body 112 and also has a void 161 which incases various components of the bypass unit 130 to help protect them from physical damage.

Figure 13:
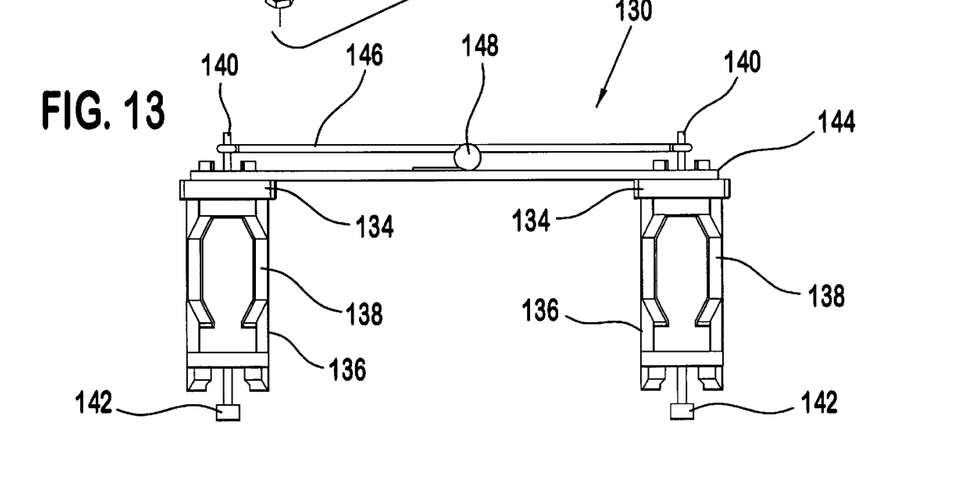
FIG. 13 is a plan view of the preferred bypass unit.

The bypass unit 130 is shown in FIGS. 12 and 13 and includes two contact assemblies 132 extending from a PC board 144. The PC board preferably includes a ground trace (not shown) extending between the contact assemblies 132. Each contact assembly 132 includes a di-electric spool 134 adjacent to the PC board 144. A receptacle 140 extends through the spool 134 and the PC board 144. A probe 142 extends from the free end of the receptacle 140. The ends of the receptacles 140 adjacent to the PC board 144 are connected by a wire 146 extending behind the PC board 144.

A capacitor 148 is positioned behind the PC board 144 and is soldered between the wire 146 and the ground trace to provide RF suppression. Through the interconnection of the contact assemblies 132, a signal can travel from a first probe 142, through the receptacle 140, along the wire 146, through the other receptacle 140 and to the other probe 142 to reroute the signal.

A guide 136 extends over each di-electric spool 134. The guide 136 assists alignment of the contact assemblies 132 as they are inserted into the plug ports 27 and causes a slight space between the terminal housing 40 and the main housing 26 as will be described hereinafter. A ground spring 138 is also included on each contact assembly 132 and makes contact with the tap housing 26 to ground the bypass tap tool 100.

Figures 14, 15, 16:
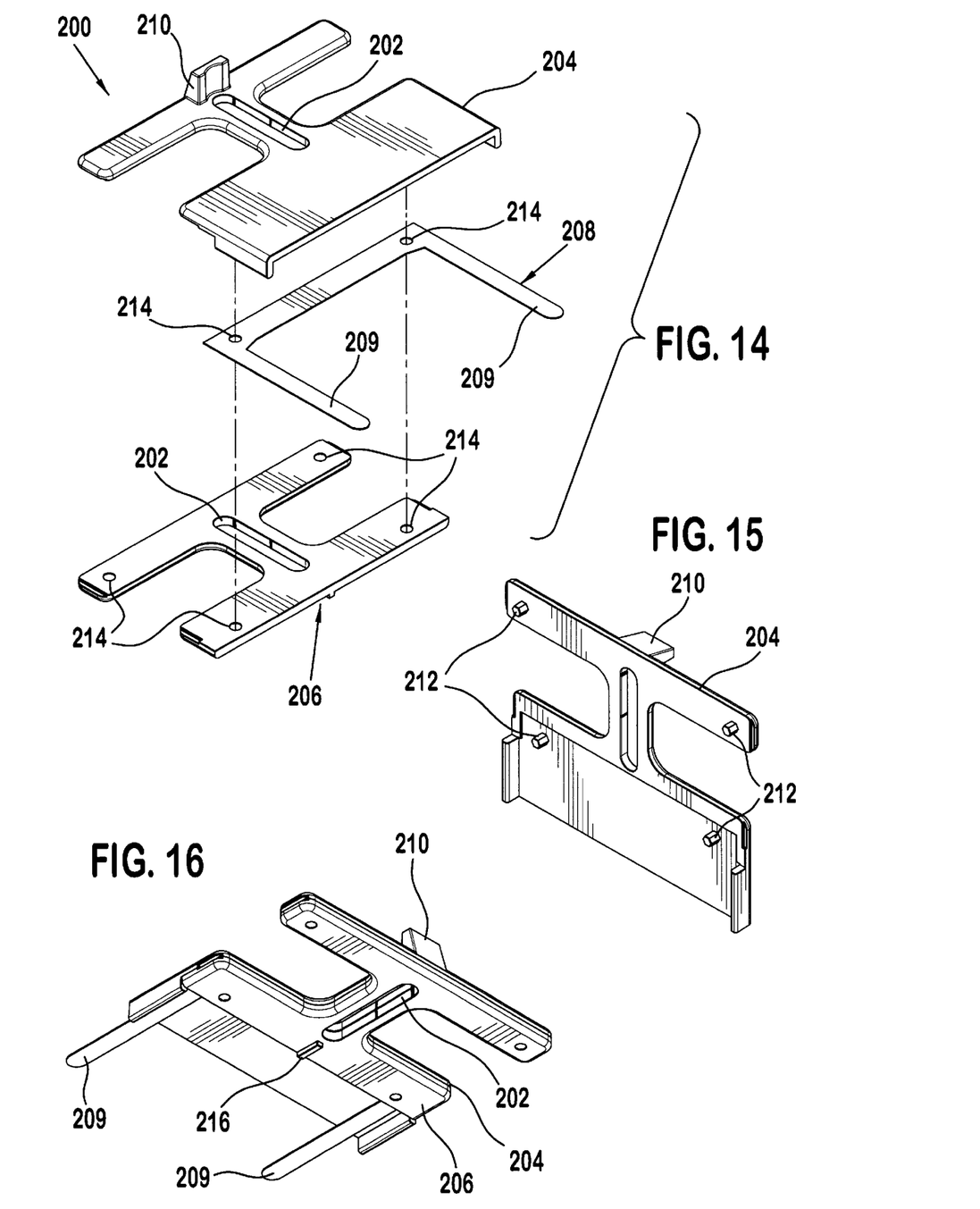
FIG. 14 is an isometric view of the preferred insulator slide assembly in a disassembled condition.
FIG. 15 is an isometric view of the insulator slide top member.
FIG. 16 is a bottom isometric view of the insulator slide assembly.

The insulator slide assembly 200 will be described with reference to FIGS. 14–16. The insulator slide assembly 200 has a general I-shape which complements that of the bypass assembly 110, but is slightly shorter. The slide assembly 200 includes top and bottom members 204 and 206 and an insulator member 208 positioned therebetween. The insulator member 208 is preferably a U-shaped stamping which includes a pair of insulator extensions 209 which extend beyond the top and bottom members 204 and 206. The insulator member 208 is manufactured from an insulative material, preferably mylar 14EL. As shown in FIG. 15, the inside of the insulator slide top member 204 includes a plurality of pegs 212. These pegs 212 align with receiving apertures 214 in the insulator slide bottom member 206 and are configured to provide a snap fit between the top and bottom members 204 and 206. Other interconnection means can be used, but the snap fit is preferred because it allows the insulator member 208 to be removed and replaced quickly and easily if it is damaged. The insulator member 208 preferably includes receiving apertures 214 through which the pegs 212 pass to maintain the insulator member 208 in position. As shown in FIGS. 14 and 16, the insulator slide bottom member 206 includes a protrusion 216 which fits into the groove 127 on the bypass upper housing member 114 to align and maintain the orientation of the slide assembly 200 relative to the bypass assembly 110.

As the slide assembly 200 is mounted on the bypass assembly 110, each insulator extension 209 passes through a respective aperture 126 in the bypass upper housing member 114 and extends along the contact assembly 132. Once mounted, the insulator slide assembly 200 is moveable between a retracted position and an extended position where the extensions 209 extend beyond the ends of the contact assemblies 132. In the retracted position, the extensions 209 are preferably within the bypass assembly 110. The insulator slide top member 204 includes a force application element 210 to assist sliding movement of the insulator slide assembly 200.

Figure 17:
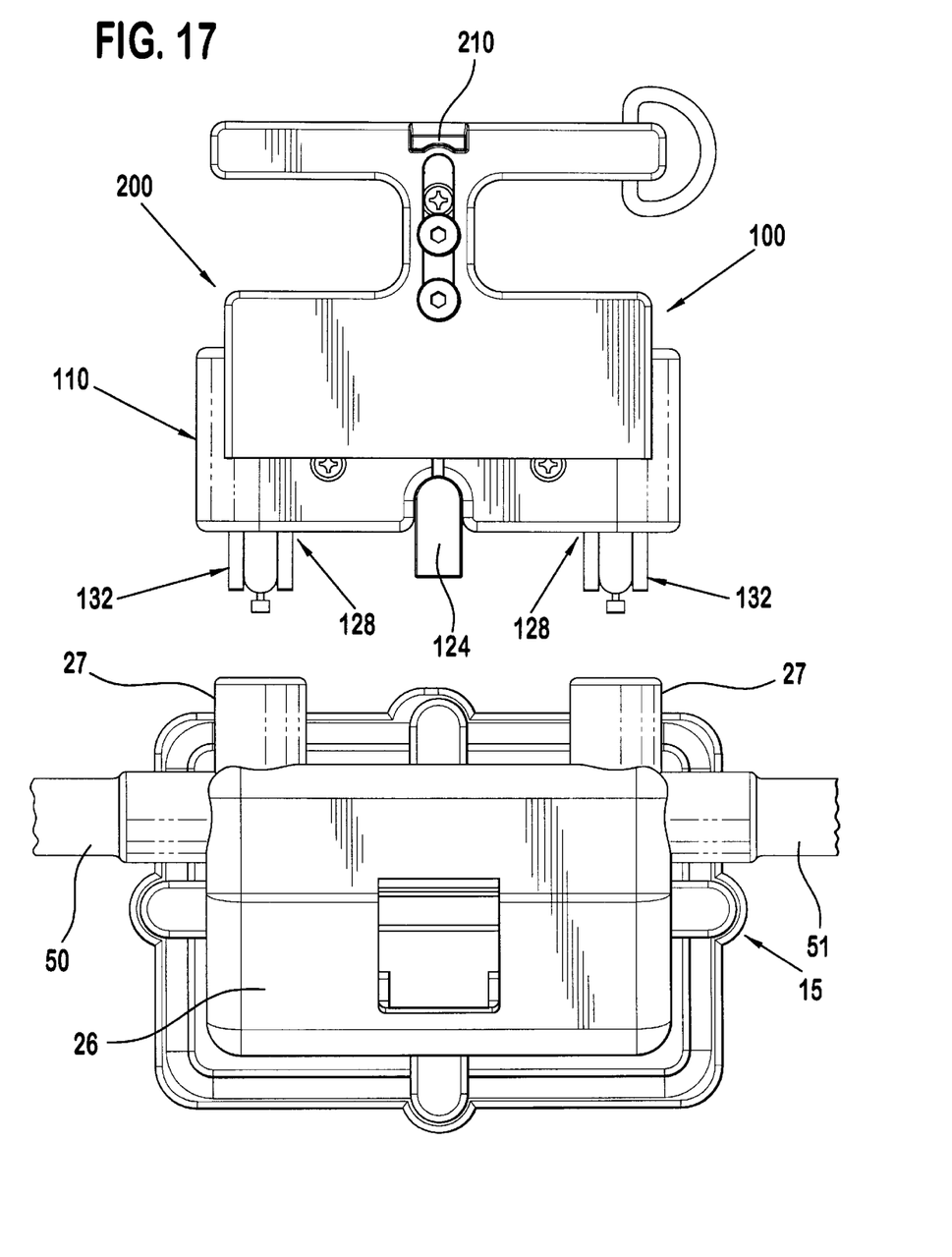
FIG. 17 is an elevation view of the preferred bypass tap tool aligned with a tap.
Figure 18:
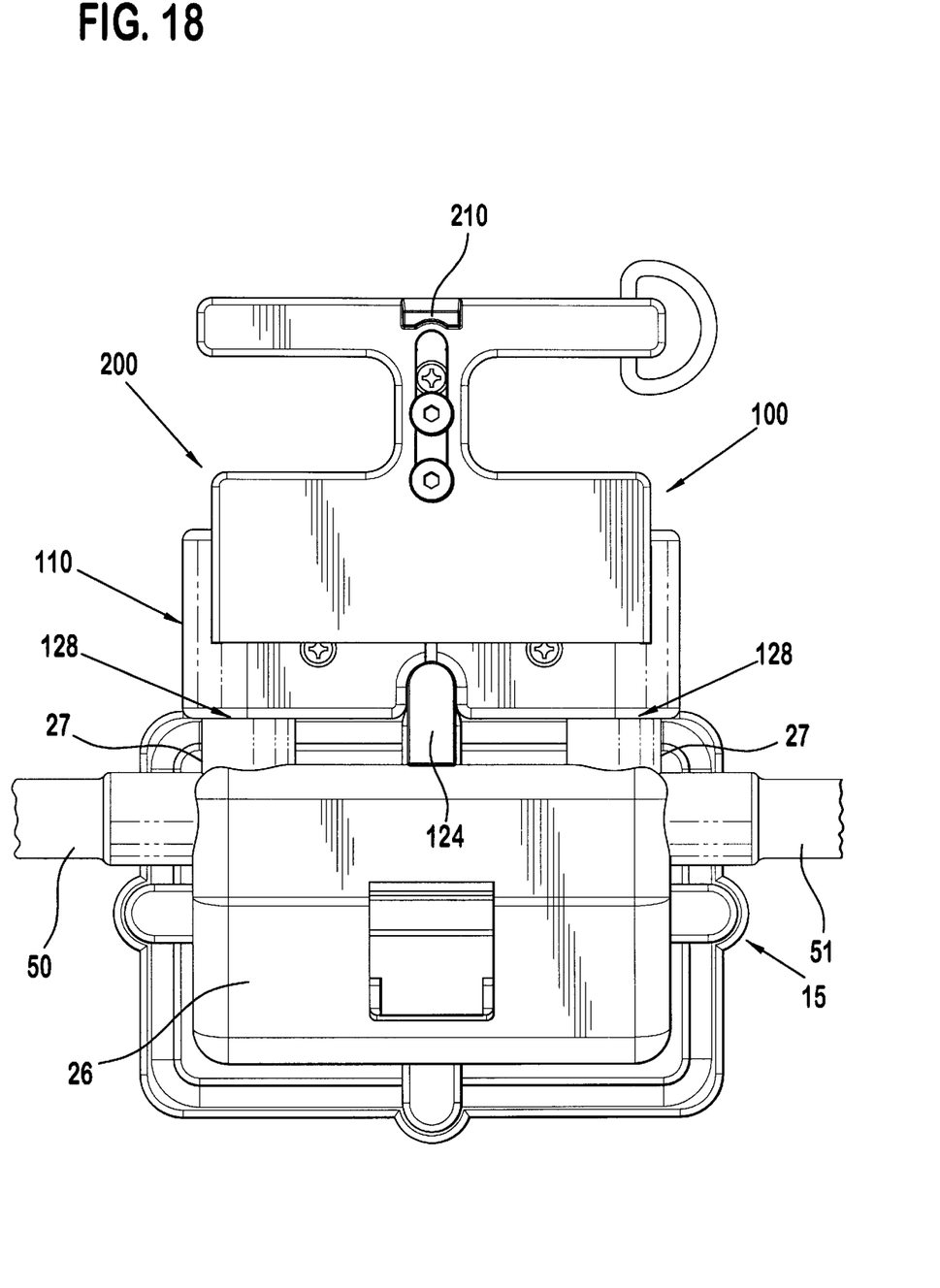
FIG. 18 is an elevation view of the preferred bypass tap tool interconnected with a tap with the insulator slide assembly in the retracted position.
Figure 19:
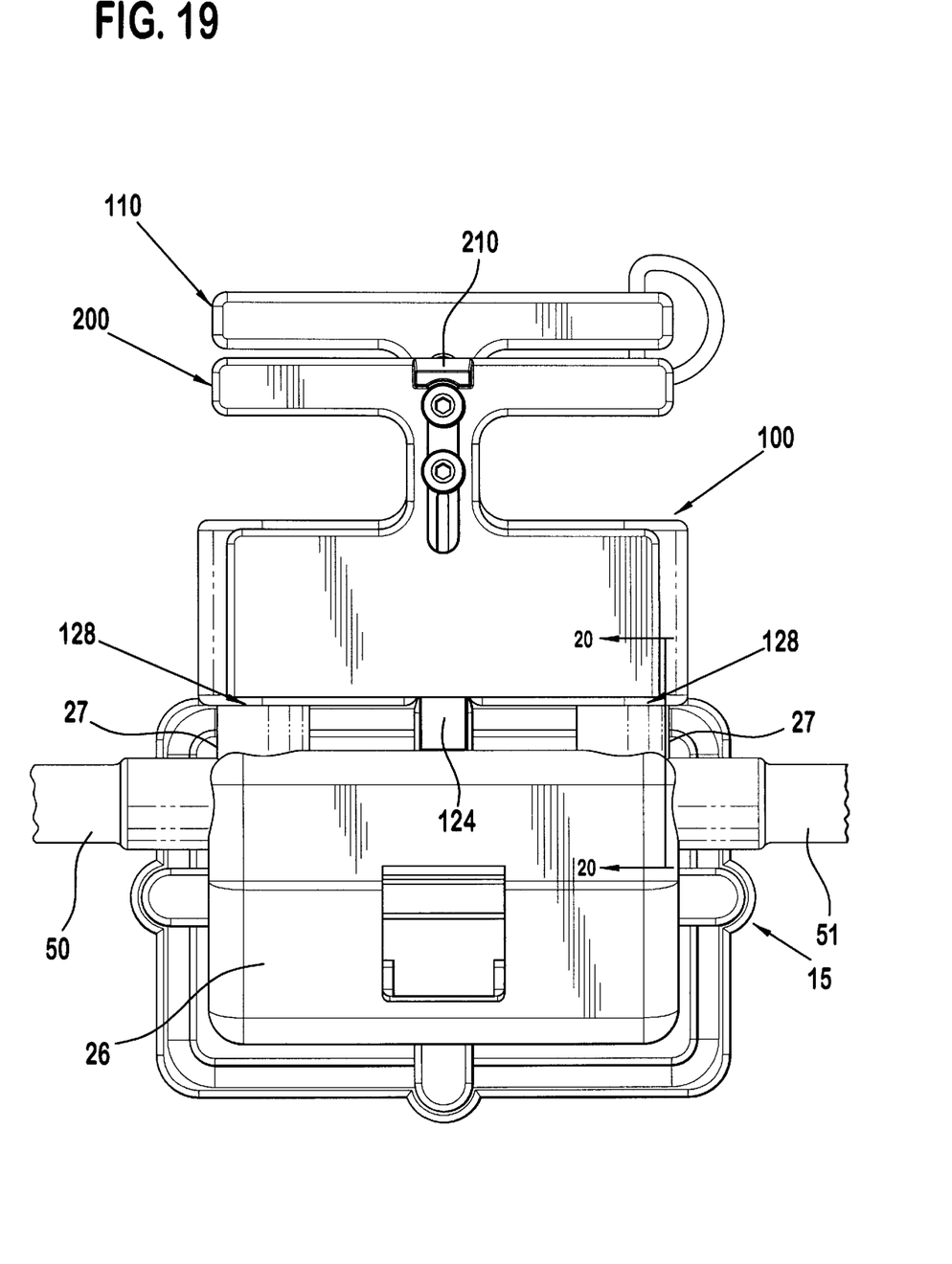
FIG. 19 is an elevation view of the preferred bypass tap pool interconnected with a tap with the insulator slide assembly in the extended position.
Figure 20:
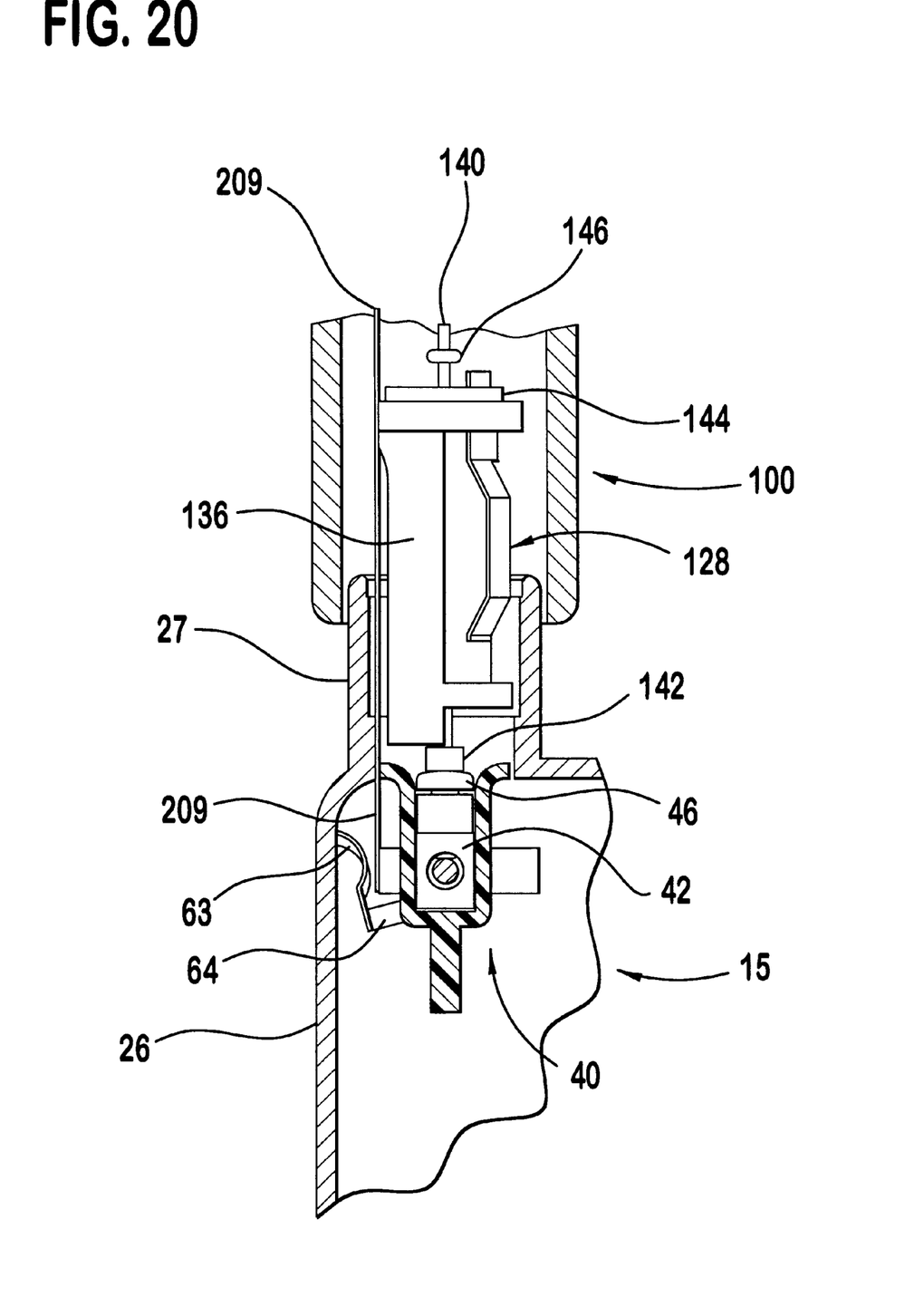
FIG. 20 is a section view taken along the line 20—20 in FIG. 19.

Operation of the bypass tap tool 100 will be described with reference to FIGS. 17–20. To prepare the tap 15 for service, the plugs 28 are removed from the respective plug ports 27. The protective cap 250 is removed from the bypass assembly 110 and the contact assemblies 132 are aligned with the open plug ports 27. As shown in FIG. 17, at this stage the insulator slide assembly 200 is in the retracted position. Referring to FIG. 18, the bypass tap tool 100 is then inserted onto the tap 15 with the contact assemblies 132 entering into plug ports 27 and the contact ports 128 encasing the plug ports 27. The bypass assembly 110 is moved forward until the contact probes 142 are in contact with the terminal screws 46. Referring to FIG. 20, as the bypass assembly 110 is moved forward, the guides 136 push between the terminal housing 40 and the main housing 26 to create a slight space therebetween.

If the service technician is certain that the tap 15 does not include a bypass switch 60, the tap cover 10 can be removed and the bypass assembly 110 will allow the signal to bypass the open circuited tap. However, if the service technician is at all uncertain about whether the tap 15 includes a bypass switch 60, the insulator slide assembly 200 should be utilized. As shown in FIGS. 19–20, the insulator slide assembly 200 is pushed forward by the force application element 210 until it has reached the extended position. As the insulator slide assembly 200 is pushed forward, the insulator extensions 209 extend through the slight space created and into the tap 15. If the tap 15 does not include a bypass switch, the insulator extensions 209 will generally have no effect. However, if the tap 15 does have an internal bypass switch 60, each insulator extension 209 will move into a position between the end of the leaf spring conductor 63 and the respective contact terminal 42. In either case, the tap 15 is ready for removal of the tap cover 10. Once the cover 10 is removed, the signal will flow through the bypass unit 130 and bypass the tap 15. This will occur whether or not a bypass switch 60 is present since the insulator extensions 209 will prevent the leaf spring conductor ends, 63, if present, from making electrical contact with the contact terminals 42.

While the present invention has been described in terms of the preferred embodiment, other variations which are within the scope of the invention as defined in the claims will be apparent to those skilled in the art.

What is claimed:

1. A bypass tap tool for bypassing a signal tap having a pair of plug ports and a contact terminal aligned with each plug port, the bypass tap tool comprising:

a housing having at least two contact ports;

a pair of conductively interconnected contact assemblies positioned in and extending from the housing contact ports; and an insulator assembly mounted on the housing and including two insulator extensions, each extension adjacent to a respective contact assembly and moveable between a non-insulating position and an extended insulating position wherein it extends beyond the contact assembly whereby the bypass tap tool is adapted to be interconnected with the signal tap with the contact assemblies entering the plug ports and conductively contacting the contact terminals to provide a bypass route and the extensions being moved from the non-insulating position to the extended insulating position wherein they are adjacent to the contact terminals and reduce the risk of a short circuit.

2. The bypass tap tool of claim 1 wherein the housing has a generally I-shape which defines a contact end, from which the contact assemblies extend, and a handle end.

3. The bypass tap tool of claim 2 wherein the insulator assembly includes a generally I-shaped body structure which complements that of the housing.

4. The bypass tap tool of claim 3 wherein the insulator body structure includes a protrusion which fits into a groove on the housing for alignment thereof.

5. The bypass tap tool of claim 1 wherein the housing includes a pair of apertures, each aperture aligned with a respective contact port, and each extension extends through a respective aperture into position adjacent the respective contact assembly.

6. The bypass tap tool of claim 1 wherein the extensions are part of an insulator member.

7. The bypass tap tool of claim 6 wherein the insulator member is manufactured from mylar 14 EL.

8. The bypass tap tool of claim 6 wherein the insulator member is generally U-shaped.

9. The bypass tap tool of claim 1 wherein the insulator assembly includes a body structure from which the extensions extend.

10. The bypass tap tool of claim 9 wherein the extensions are part of an insulator member.

11. The bypass tap tool of claim 10 wherein the insulator assembly body structure includes top and bottom members between which a portion of the insulator member is maintained.

12. The bypass tap tool of claim 1 wherein the extensions are manufactured from mylar 14 EL.

13. The bypass tap tool of claim 1 wherein the insulator assembly includes a force application element to assist movement of the extensions.

14. The bypass tap tool of claim 1 wherein in the non-insulating position the extension members are within the housing.

15. The bypass tap tool of claim 1 wherein the housing includes a key which assists alignment of the tap tool.

16. The bypass tap tool of claim 1 wherein the housing includes a groove for alignment of the insulator assembly.

17. The bypass tap tool of claim 1 wherein the contact assemblies are mounted on a PC board and have a conductive wire extending between them.

18. The bypass tap tool of claim 17 wherein a ground trace extends along the PC board between the contact assemblies.

19. The bypass tap tool of claim 18 wherein a capacitor is positioned between the wire and the ground trace to provide RF suppression.

20. The bypass tap tool of claim 1 wherein each contact assembly includes a guide which helps create a space in the tap for the respective extension to extend through.

21. A bypass tap tool for bypassing a signal tap of a type having a pair of plug ports, a contact terminal aligned with each plug port, and an internal bypass switch that conductively contacts the contact terminals to provide a bypass route, the bypass tap tool comprising:

a housing having at least two contact ports;

a pair of conductively interconnected contact assemblies positioned in and extending from the housing contact ports; and an insulator assembly mounted on the housing and including two insulator extensions, each extension adjacent to a respective contact assembly and moveable between a non-insulating position and an extended insulating position wherein it extends beyond the contact assembly whereby the bypass tap tool is adapted to be interconnected with the signal tap with the contact assemblies entering the plug ports and conductively contacting the contact terminals to provide an alternate bypass route and the extensions being moved from the non-insulating position to the extended insulating position wherein they are adjacent to the contact terminals and prevent conductive contact by the bypass switch.

22. A method of preparing a signal tap for servicing, the tap having a cover, a pair of plug ports and a contact terminal aligned with each plug port, the method comprising the steps of:

providing a bypass tap tool comprising:
a housing having at least two contact ports;
a pair of conductively interconnected contact assemblies positioned in and extending from the housing contact ports; and
an insulator assembly mounted on the housing and including two insulator extensions, each extension adjacent to a respective contact assembly and moveable between a non-insulating position and an extended insulating position wherein it extends beyond the contact assembly;

positioning the extensions in the non-insulating position;

interconnecting the bypass tap tool with the signal tap with the contact assemblies entering the plug ports and conductively contacting the contact terminals to provide a bypass route;

moving the extensions from the non-insulating position to the extended insulating position wherein they are adjacent to the contact terminals; and removing the tap cover.

* * * * *